US006654809B1

(12) United States Patent
Hulme et al.

(10) Patent No.: US 6,654,809 B1
(45) Date of Patent: Nov. 25, 2003

(54) DATA PROCESSING DEVICE

(75) Inventors: Peter Hulme, Bourne End (GB); Garry Thorn, Marlow (GB)

(73) Assignee: STMicroelectronics Limited, Almondsbury (GB)

( * ) Notice: Subject to any disclaimer, the term of this patent is extended or adjusted under 35 U.S.C. 154(b) by 536 days.

(21) Appl. No.: 09/625,128

(22) Filed: Jul. 25, 2000

(30) Foreign Application Priority Data

Jul. 27, 1999 (GB) .............................. 9917611

(51) Int. Cl.$^7$ .............................................. G06F 15/16
(52) U.S. Cl. ...................... 709/231; 709/230; 709/246; 386/112
(58) Field of Search ................................. 709/231, 230, 709/246; 386/33, 45, 111, 112, 125, 126

(56) References Cited

U.S. PATENT DOCUMENTS

| 5,596,581 | A | | 1/1997 | Saeijs ........................ 370/394 |
| 5,602,595 | A | * | 2/1997 | Citta et al. .................. 348/495 |
| 5,742,361 | A | | 4/1998 | Nakase et al. ............... 348/845 |
| 5,917,830 | A | * | 6/1999 | Chen et al. .................. 370/487 |
| 6,115,422 | A | * | 9/2000 | Anderson et al. ............ 375/240 |
| 6,172,988 | B1 | * | 1/2001 | Tiernan et al. ............... 370/473 |
| 6,229,801 | B1 | * | 5/2001 | Anderson et al. ............ 370/349 |
| 6,393,202 | B1 | * | 5/2002 | Yamauchi et al. ............ 386/95 |
| 6,463,059 | B1 | * | 10/2002 | Movshovich et al. ....... 370/389 |

FOREIGN PATENT DOCUMENTS

| EP | 0 893 913 | 1/1999 | ............ H04N/5/00 |
| EP | 0 905 983 | 3/1999 | ............ H04N/7/52 |
| EP | 0 921 690 | 6/1999 | ............ H04N/7/62 |
| EP | 0 933 927 | 8/1999 | ............ H04N/5/00 |

* cited by examiner

Primary Examiner—Mehmet B. Geckil
(74) Attorney, Agent, or Firm—Wolf, Greenfield & Sacks, P.C.; James H. Morris

(57) ABSTRACT

A data stream processing device for processing a succession of information datagrams from multiple data streams, each datagram comprising a payload and an identifier identifying the data stream of which the datagram forms part, the device comprising: a storer for storing an indication of which of the data streams are required for use; a memory; and a datagram processor connected to the storer and the memory and arranged for: receiving incoming datagrams, reading the identifiers of received datagrams and thereby identifying the data stream of which each datagram forms part, and storing in the memory received datagrams that form part of a data stream required for use, and if successively received datagrams that form part of a data stream required for use are interspersed by one or more received datagrams that do not form part of a data stream required for use, storing an indication of the spacing between the said successively received datagrams.

16 Claims, 2 Drawing Sheets

DATA PROCESSING DEVICE

FIELD OF THE INVENTION

The invention relates to a data processing device for processing information datagrams from multiple data streams.

BACKGROUND OF THE INVENTION

A composite transport stream of video information of the type broadcast for home use, usually via satellite or cable, comprises a number of data streams, each data stream corresponding to a channel. Each data stream is transmitted in blocks, which are commonly known as datagrams. This means that instead of each channel being transmitted as a whole, datagrams from each channel are transmitted at time intervals and may be multiplexed with datagrams from some or all of the other channels. These datagrams are generally received by the user's personal set top box (STB), which records the datagrams, and then reassembles and re-transmits to other equipment, such as a television or video recorder, the channel which has been selected by the user. The set top box comprises a demultiplexor which selects the datagrams from the channel which has been selected by the user, thus allowing datagrams of the correct channel to be re-assembled and re-transmitted to the user apparatus. The STB may use a hard disk drive to store the data.

The standard most widely used in Europe for video and audio transmission, and for certain other types of data, is the DVB System. Under this system, the composite transport stream is called a DVB stream and the datagrams are in the form of packets conveying MPEG2 data. An MPEG2 frame comprises a number of packets. These packets comprise a payload, which is the actual video or audio data, and a header that contains information, such as an indication of the data stream of which the packet forms part and timing information. A typical DVB stream will contain a number of video and audio channels, along with subtitles, teletext, information on program schedules, information for conditional access used for pay-TV, and tables which show how to combine different parts of these features to provide any of the possible services. For example, the tables could tell the user how to pay for and record a particular pay-programme at a particular time.

In order for the user to record or view a given channel transmitted inside a given DVB stream, the STB software must find the system information relating to that channel, which will give the identifiers of the video packets, the audio packets, teletext and timing information which can be used to reassemble the channel within the STB. After being reassembled and processed into a video stream, the channel is sent on to the appropriate apparatus, such as a video or television.

STB systems currently available on the market are designed to process the incoming data and send it straight on to the user apparatus, thus avoiding the need for large amounts of data storage capacity. It would be advantageous to the user for the STB system to have the capability of delayed playback, so that a particular channel could be viewed at a time after it was broadcast. In other words the STB would be acting as a digital video recorder. A typical composite transport stream is around 5Mbytes/sec of data, so good quality digital record and replay takes at least 10Mbytes/sec transfer rate between the datagram processing apparatus and the storage unit (e.g. hard disk drive). This rate is generally beyond the capability of the typical low-cost hard disk drives in use today.

It would be desirable to provide a system capable of reducing the required transfer rate, whereby the need for the user to invest in expensive, high-memory capability hard disk drives may be avoided. Ideally such a system would be usable with a standard set-top box.

SUMMARY OF THE INVENTION

According to the present invention there is provided a data stream processing device for processing a succession of information datagrams from multiple data streams, each datagram comprising a payload and an identifier identifying the data stream of which the datagram forms part, the device comprising: a storer for storing an indication of which of the data streams are required for use; a memory; and a datagram processor connected to the storer and the memory and arranged for: receiving incoming datagrams, reading the identifiers of received datagrams and thereby identifying the data stream of which each datagram forms part, and storing in the memory received datagrams that form part of a data stream required for use, and if successively received datagrams that form part of a data stream required for use are interspersed by one or more received datagrams that do not form part of a data stream required for use, storing an indication of the spacing between the said successively received datagrams, and for each received datagram that does not form part of a data stream required for use forming a modified datagram comprising the identifier of the datagram that does not form part of a data stream required for use and excluding at least part of the payload of that datagram, and storing the modified datagram in the memory.

Advantageously the modified datagram contains timing information. Conveniently this timing information is derived from the payload of the respective datagram and is indicative of the relative timing of the said successive datagrams.

Preferably in order to store the said indication of the spacing the datagram processor is arranged to store in the memory the number of received datagrams that do not form part of a data stream required for use that intersperse the said successively received datagrams.

Preferably the data stream processing device further comprises a retrieving unit for retrieving from the memory the stored datagrams that form part of a data stream required for use, and outputting those datagrams at a spacing according to stored indications of spacings. Advantageously the output datagrams that form part of a data stream required for use are interspersed by a number of further output datagrams. Conveniently the retrieving unit generates the said further output datagrams by retrieving the modified datagrams from the memory and adding a dummy payload to them. Alternatively the retrieving unit could generate the said further datagrams by forming the said number of dummy datagrams. Suitably the further datagrams are configured so as to be discarded by a subsequent receiver.

Alternatively the retrieving unit is capable of being configured to output the stored datagrams that form part of a data stream that is required for use with no datagrams between them.

Usefully the retrieving unit is operable in response to a request by a user to begin retrieval of datagrams.

Preferably the data stream processing device further comprises a transmitter for transmitting the output datagrams from the data stream processing device. Advantageously the transmitter is connectable to a set top box for outputting the datagrams thereto.

It is further preferable that the data stream processing device is in the form of a module for use with a set top box.

The datagrams which are transmitted to the data stream processing device may comprise DVB, DSS or ATSC transport data packets.

An embodiment of the present invention will now be described by way of example with reference to the accompanying drawings, in which:

DESCRIPTION OF THE PREFERRED EMBODIMENTS

The preferred embodiment forms part of a personal user system for recording digital video data and replaying it into a digital STB, in which it can be processed to produce a video and audio stream. A suitable arrangement of the apparatus of the user system is shown diagrammatically in FIG. 1. This figure shows a layout of such apparatus, including a record and playback integrated circuit (chip), which when equipped with a hard disk drive or other suitable storage unit and implemented in an STB or added to an existing STB can provide storage and delayed playback of programmes.

Figure 1:
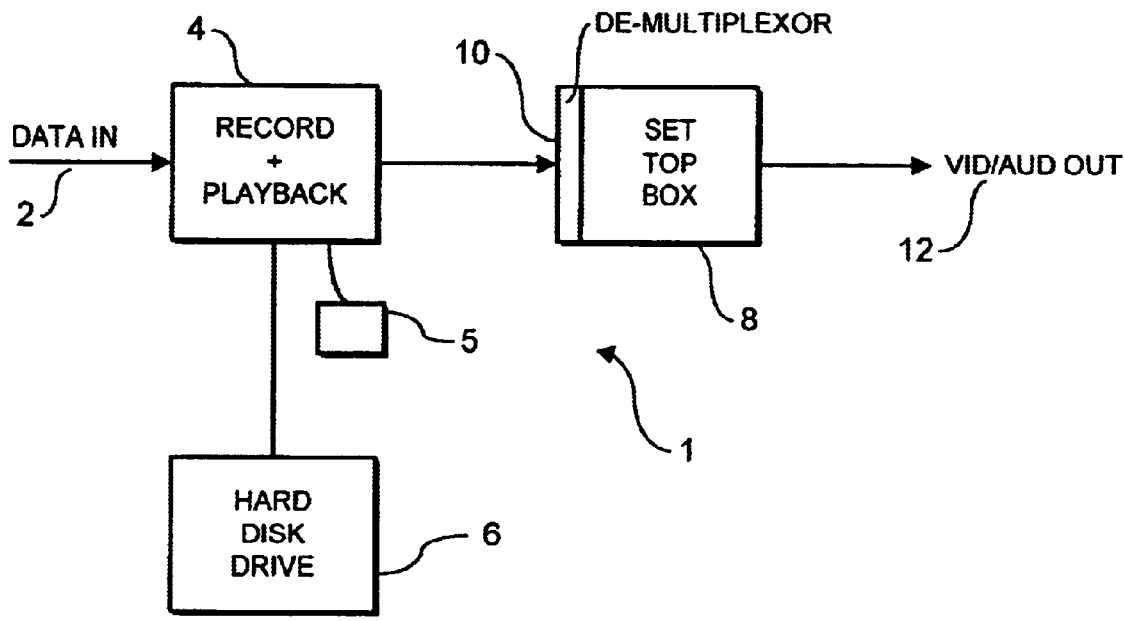
FIG. 1 is a diagrammatic representation of the user system for processing data into video streams

In FIG. 1, data enters the system in the form of DVB, DSS or ATSC Transport packets at 2 (DATA IN), for example via satellite, cable or terrestrial transmissions. The system is labelled generally as 1. The data enters record and playback chip 4, wherein it is processed as will be described below. This record and playback chip 4 operates in conjunction with hard disk drive 6, which is of standard, inexpensive specification. The processed data is then sent to the STB 8, which it enters via demultiplexor 10. The STB 8 further processes the data to produce a video and audio stream (VID/AUD OUT 12) which goes to user apparatus, such as a video recorder or television.

The data structure and apparatus will now be described in greater detail.

Figure 2:
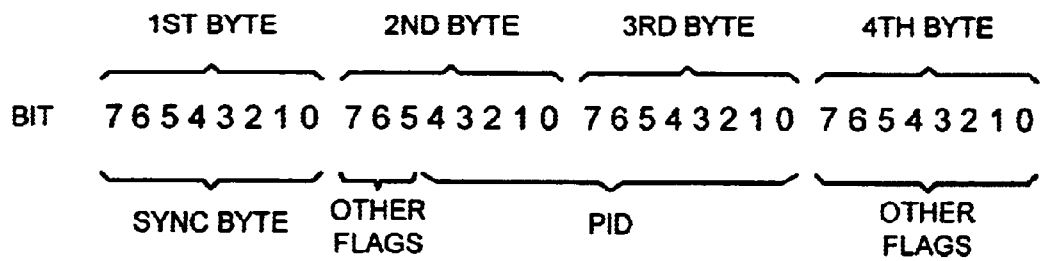
FIG. 2 is a diagrammatic representation of the header of an MPEG2 packet

A DVB Transport packet is 188 bytes long and begins with a four byte header, the structure of which is shown diagrammatically in FIG. 2. The first byte is a 0x47 hexadecimal indicating the start of a transport packet, labelled SYNC BYTE. This is a DVB standard byte which indicates that the following bytes will be incoming data. The Packet Identifier (labelled PID) is a number between 0 and 0x1FFF hexadecimal, which indicates the channel of which the packet forms a part. The remainder of the header is used for various flags. One of these flags is called the transport error indicator flag and if set indicates that the packet contains erroneous data and that it should be discarded by the STB demultiplexor. The remaining 184 bytes are the payload of the packet and four of these bytes contain packet timing information. The number of bytes of timing information could be varied.

In this embodiment, the composite data stream is formed of seven channels. More or fewer channels could be present. The video data for each channel represents the bulk of the information, being of the order of 0.7M Bytes/second per channel. In addition there might be another 1.5MBytes/second of other packets, including the audio and system information packets for the seven channels.

Figure 3:
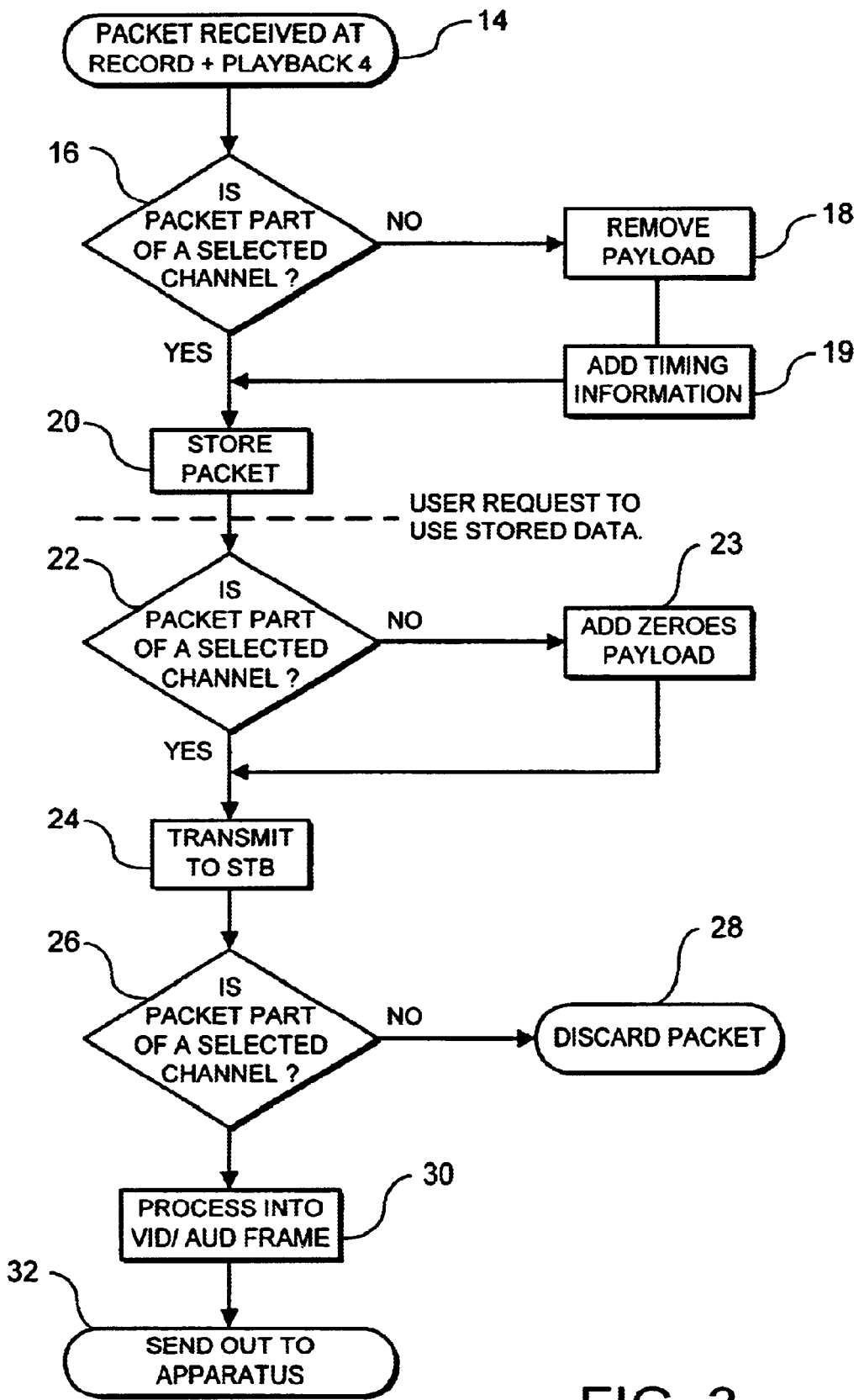
FIG. 3 is a flowchart of the processing operation carried out on MPEG2 packets

The record and playback chip 4 stores in local memory 5, which could be on chip 4, a list of PIDs necessary for the channel that has been selected by the user The sequence of operation of processing a packet is shown as a flow chart in FIG. 3.

A packet arrives at the record and playback chip 4 as indicated at 14. The chip 4 then consults the list of channel PIDs stored in the memory 5. The packet's PID is compared to the list of PIDs in order to determine whether the packet forms part of the channel that has been selected by the user, as shown at step 16.

If the packet does form part of the selected channel, it is stored by the chip 4 in the hard disk drive (step 20). Since the payload includes four bytes of timing information as explained above, the elapsed time since the previous packet was received is also stored.

If the packet does not form part of the selected channel, its payload of 184 bytes is removed in step 18, thus greatly compressing the packet by leaving only the first four bytes which form the header. These header bytes are unaltered, which means that the header still indicates which channel the packet forms part of. Since the packet timing information was contained in the removed payload, timing information is then added to the remaining header so that the elapsed time since the previous packet was received is known. This can be derived by extracting it from the former payload or can be generated independently. The modified packet is stored in the hard disk drive as indicated by step 20. Alternatively, a count of the discarded packets may be kept and stored prior to storing the next packet which is stored in full. A further alternative is to just store a direct indication of the time spacing between packets of a selected channel, e.g. in milliseconds. In low jitter environments, or where the packets' payloads include sufficient timing information that an STB can reassemble them satisfactorily if they are output from the record and playback chip at its natural rate the record and playback chip may be able to produce a satisfactory output without storing timing information for any or all of the modified packets.

Timing information is important when transmitting the current packet to the STB as described below, because it is important that the packet is received by the STB at the appropriate time after the previous packet. This is because the STB needs to co-ordinate video and corresponding audio frames and has to be able to cope with the data flow. If the STB were to receive too much data at once, its buffers could overflow resulting in loss of data. If it were to receive too little data over a period of time, it would not be able to process the data to give a satisfactory quality of output to the user apparatus. The other reason for needing to use timing information is for jitter handling purposes. This last reason might not be important in an environment in which the datagrams arrive at the record and playback chip 4 with sufficient regularity i.e. with sufficiently low jitter, however, since the system is intended for use with many different digital transport systems, it is an important consideration in most practical implementations.

When the user wishes to use the stored data, the record and playback chip 4 retrieves packets from the hard disk drive. If a packet forms part of the selected channel, as determined in step 22, the packet is transmitted to the STB according to step 24. If however the packet does not form part of the selected channel, as determined in step 22, a dummy payload of an arbitrary value is added to the retrieved packet (the packet consisting of four bytes of header and timing information), as indicated by step 23, so that the packet is padded to its original size. As explained above, the processing steps of removing the payload and replacing it with a timing and an arbitrary payload has not affected the timing information associated with the packet. This means that this packet will be transmitted to the STB with its correct time relative to the previous packet and with the correct duration for that packet, as indicated in step 24. If only a count of packets not forming part of the selected channel has been stored, this number of packets can be recreated containing dummy data of an arbitrary value and with the transport error indicator flag set. The values of the identification data (PID) in this case is irrelevant as the dummy packets will be discarded by the STB. Alternatively a gap may be left in the output stream equivalent to the duration of these dummy packets.

Therefore by processing the packets prior to sending them onto the STB, the volume flowrate of data is greatly reduced, yet by using the method of compressing unnecessary packets and replaying them with dummy payloads, the transport stream will not appear any different in effect to the STB. In other words, the packets have been processed without affecting their timing or useful content, but reducing bandwidth requirements. This is important because it means that a standard specification hard disk drive may well be sufficient to store the modified data and a standard STB can be used. Such a record and playback chip is simply added to a standard STB. In practice, such a modification amounts to only minimal changes in the STB software, allowing easy conversion of current STB units. New STBs may be manufactured with such a chip installed.

In this example, by compressing the video, audio and system packets of the unwanted six of the seven channels from 188 down to 8 bytes the stream is reduced from approximately 5MBytes/second to less than 1Mbyte/second. In other words, the composite transport stream can be reduced to around 20% of its original size, allowing 5 times as much data to be stored and a correspondingly slower hard disk drive to be used.

Following the processing described above, the data is passed to the STB (step 24). The STB has a demultiplexor at its input which selects certain data packets for processing, and discards others, according to whether they form part of the channel selected by the user. This is shown as step 26 in FIG. 3. The STB uses the header information to do this, therefore the processing described above does not affect the STB's ability to perform this task. If the STB identifies a packet to be part of one of the six unwanted channels, it discards it, as indicated by step 28. However, packets identified to be part of the selected channel are processed to produce video and audio outputs, step 30. These outputs are then sent to the user apparatus, such as a video or television, as indicated by step 32.

It will be appreciated that the above embodiment can be modified within the scope of the invention. For example, the composite data stream could comprise more than seven channels or it could be transmitted over a different medium. The proposed chip could be scaled to include multiple inputs and multiple outputs, and also multiple storage devices. For example, local storage of a number of programmes for a hotel could be allowed, and then just that selection would be offered to hotel guests. Alternatively a single STB could provide the ability to record one channel while watching another, or collect separate channels and join them together to produce a composite programme. Thus the apparatus mentioned above could maintain timing between datagrams of a number of channels. The record and playback unit could be implemented other than on a chip, for example by discrete components.

The principles described above could be used in other data processing environments, especially where it is desired to reduce required bandwidth or storage capacity whilst maintaining timing or spacing of datagrams of desired channels. Examples include fixed line or mobile telecommunications systems.

What is claimed is:

1. A data stream processing device for processing a succession of information datagrams from multiple data streams, each datagram comprising a payload and an identifier identifying the data stream of which the datagram forms part, the device comprising:
    a storer for storing an indication of which of the data streams are required for use;
    a memory; and
    a datagram processor connected to the storer and the memory and arranged for:
        receiving incoming datagrams,
        reading the identifiers of received datagrams and thereby identifying the data stream of which each datagram forms part, and
        storing in the memory received datagrams that form part of a data stream required for use, and
        if successively received datagrams that form part of a data stream required for use are interspersed by one or more received datagrams that do not form part of a data stream required for use, storing an indication of the spacing between the said successively received datagrams, and for each received datagram that does not form part of a data stream required for use, forming a modified datagram comprising the identifier of the datagram that does not form part of a data stream required for use and excluding at least part of the payload of that datagram, and storing the modified datagram in the memory.

2. A data stream processing device as claimed in claim 1, wherein the modified datagram contains timing information.

3. A data stream processing device as claimed in claim 2, wherein the timing information is derived from the payload of the respective datagram.

4. A data stream processing device according to claim 2, wherein the timing information is indicative of the relative timing of the said successive datagrams.

5. A data stream processing device as claimed in claim 1, wherein in order to store the said indication of the spacing the datagram processor is arranged to store in the memory the number of received datagrams that do not form part of a data stream required for use that intersperse the said successively received datagrams.

6. A data stream processing device according to claim 1, further comprising a retrieving unit for retrieving from the memory the stored datagrams that form part of a data stream required for use, and outputting those datagrams at a spacing according to stored indications of spacings.

7. A data stream processing device according to claim 6, wherein the output datagrams that form part of a data stream required for use are interspersed by a number of further output datagrams.

8. A data stream processing device according to claim 7, wherein the retrieving unit generates the said further output datagrams by retrieving the modified datagrams from the memory and adding a dummy payload to them.

9. A data stream processing device according to claim 7, wherein in order to store the said indication of the spacing the datagram processor is arranged to store in the memory the number of received datagrams that do not form part of a data stream required for use that intersperse the said successively received datagrams, and the retrieving unit generates the said further datagrams by forming the said number of dummy datagrams.

10. A data stream processing device as claimed in claim 7, wherein the further datagrams are configured so as to be discarded by a subsequent receiver.

11. A data stream processing device as claimed in claim 6, wherein the retrieving unit is capable of outputting the stored datagrams that form part of a data stream that is required for use with no datagrams between them.

12. A data stream processing device according to claim 6, wherein the retrieving unit is operable in response to a request by a user to begin retrieval of datagrams.

13. A data stream processing device according to claim 6, further comprising a transmitter for transmitting the output datagrams from the data stream processing device.

14. A data stream processing device according to claim 6, wherein the transmitter is connectable to a set top box for outputting the datagrams thereto.

15. A data stream processing device according to claim 1, in the form of a module for use with a set top box.

16. A data stream processing device according to claim 1, wherein the datagrams comprise DVB, DSS or ATSC transport data packets.

* * * * *